(12) United States Patent
Dite

(10) Patent No.: US 10,676,125 B2
(45) Date of Patent: Jun. 9, 2020

(54) STEERING COLUMN ASSEMBLY

(71) Applicant: TRW Limited, Solihull, West Midlands (GB)

(72) Inventor: Jan Dite, Herálec (CZ)

(73) Assignee: TRW Limited, Solihull, West Midlands (GB)

( * ) Notice: Subject to any disclaimer, the term of this patent is extended or adjusted under 35 U.S.C. 154(b) by 57 days.

(21) Appl. No.: 16/087,149

(22) PCT Filed: Mar. 23, 2017

(86) PCT No.: PCT/EP2017/057029
§ 371 (c)(1),
(2) Date: Sep. 21, 2018

(87) PCT Pub. No.: WO2017/162843
PCT Pub. Date: Sep. 28, 2017

(65) Prior Publication Data
US 2019/0100229 A1    Apr. 4, 2019

(30) Foreign Application Priority Data
Mar. 23, 2016   (GB) .................................. 1604974.4

(51) Int. Cl.
*B62D 1/19*      (2006.01)
*B62D 1/184*    (2006.01)

(52) U.S. Cl.
CPC ............. *B62D 1/184* (2013.01); *B62D 1/192* (2013.01); *B62D 1/195* (2013.01)

(58) Field of Classification Search
CPC ......... B62D 1/195; B62D 1/184; B62D 1/192
See application file for complete search history.

(56) References Cited

U.S. PATENT DOCUMENTS 5,787,759 A * 8/1998 Olgren .................. B62D 1/184
280/777
7,685,903 B2 * 3/2010 Streng .................... B62D 1/184
74/492

(Continued)

FOREIGN PATENT DOCUMENTS

DE            10212263  A1    10/2003
DE     102008007094  A1     9/2009

(Continued)

OTHER PUBLICATIONS

Patents Act 1977: Search Report, Application No. GB 1604974.4, dated Sep. 2, 2016.

(Continued)

*Primary Examiner* — Nicole T Verley
(74) *Attorney, Agent, or Firm* — MacMillan, Sobanski & Todd, LLC

(57) ABSTRACT

A steering column assembly comprises a telescopic shroud having an outer shroud portion and an inner shroud portion, a clamp rail fixed to the inner shroud portion, a clamp bolt that extends perpendicular to the shroud, a toothed block that is connected to the clamp bolt and is displaced on rotation of the clamp bolt, and a carrier element that supports the toothed block and is movable in response to rotation of the clamp bolt to in turn move the toothed block between a clamped position and an unclamped position and is free to move from side to side relative to the slot. A frangible pin secures the toothed block to the carrier element, the frangible pin having a first end located in a bore in the toothed block and a second end located in a bore in the carrier element, the toothed block being supported on a shoulder of the frangible pin, and a clearance is provided between the frangible pin and the walls of one of the bores to permit side (Continued)

to side movement of the toothed block relative to the carrier element.

16 Claims, 7 Drawing Sheets

(56) References Cited

U.S. PATENT DOCUMENTS

| | | | | |
|---|---|---|---|---|
| 8,375,822 B2 * | 2/2013 | Ridgway | ............... | B62D 1/184 |
| | | | | 280/775 |
| 8,505,408 B2 * | 8/2013 | Havlicek | ............... | B62D 1/195 |
| | | | | 280/775 |
| 9,428,215 B1 * | 8/2016 | Nagatani | ............... | B62D 1/184 |
| 9,452,772 B2 * | 9/2016 | Owens | ............... | B62D 1/185 |
| 9,663,135 B2 * | 5/2017 | Myohoji | ............... | B62D 1/184 |
| 9,718,490 B2 * | 8/2017 | Tanaka | ............... | B62D 1/184 |
| 9,783,221 B2 * | 10/2017 | Sakuda | ............... | B62D 1/195 |
| 10,011,293 B2 * | 7/2018 | Nagatani | ............... | B62D 1/185 |
| 10,202,139 B2 * | 2/2019 | Tanaka | ............... | B62D 1/184 |
| 10,336,362 B2 * | 7/2019 | Bodtker | ............... | B62D 1/195 |
| 10,442,456 B2 * | 10/2019 | Davies | ............... | B62D 1/184 |
| 2009/0185879 A1 | 7/2009 | Cymbal | | |
| 2016/0144885 A1 * | 5/2016 | Tanaka | ............... | B62D 1/187 |
| | | | | 74/493 |
| 2018/0178826 A1 * | 6/2018 | Kagawa | ............... | B62D 1/195 |
| 2019/0152510 A1 * | 5/2019 | Shiroishi | ............... | B62D 1/192 |
| 2019/0337552 A1 * | 11/2019 | Buzzard | ............... | B62D 1/187 |

FOREIGN PATENT DOCUMENTS

| | | | | |
|---|---|---|---|---|
| EP | 2905200 A1 | | 8/2015 | |
| EP | 3023317 A1 | | 5/2016 | |
| EP | 3075632 B1 | * | 2/2018 | |
| EP | 3279059 B1 | * | 5/2019 | |
| GB | 2352284 A | * | 1/2001 | ............ B62D 1/184 |
| JP | 2017030726 A | * | 2/2017 | ............ B62D 1/195 |

OTHER PUBLICATIONS

PCT International Search Report and Written Opinion, Application No. PCT/EP2017/057029, dated Jun. 28, 2017.

* cited by examiner

STEERING COLUMN ASSEMBLY

CROSS-REFERENCE TO RELATED APPLICATIONS

This application is a national stage of International Application No. PCT/EP2017/057029, filed 23 Mar. 2017, the disclosures of which are incorporated herein by reference in entirety, and which claimed priority to Great Britain Patent Application No. 1604974.4, filed 23 Mar. 2016, the disclosures of which are incorporated herein by reference in entirety.

BACKGROUND TO THE INVENTION

This invention relates to improvements in steering column assemblies, in particular those including a positive lock mechanism having a toothed block and slot.

It is known to provide a collapsible steering column assembly comprising a steering shaft that is supported within a steering column shroud. To prevent significant injury to the driver in the event of a crash the steering column should be able to collapse as an axial load is applied through the steering wheel, for instance in a front impact where an unrestrained driver is thrown onto the steering wheel.

A typical collapsible steering column assembly comprises a telescopic shroud, having an outer shroud portion and an inner shroud portion, an end of the inner shroud portion extending into the outer shroud portion. The outer shroud portion may be located closer to the steering wheel, or further from the steering wheel than the inner shroud portion. A telescopic steering shaft, also having an upper and lower shaft part, is supported inside the shroud through one or more bearing assemblies. The steering wheel is fixed to the upper shaft portion.

The part of the shroud closest to the wheel must be able to move, or collapse, during a crash so as to allow the steering wheel to move forwards relative to the vehicle body but be prevented from moving during normal use. There is also a need to fix the shroud relative to the vehicle body to define the rake position of the steering wheel. This is typically achieved by a clamp mechanism that secures the shroud to a support bracket that is in turn fixed to the vehicle body, perhaps to a cross beam provided behind the dashboard of the vehicle. The clamp mechanism may be adjustable to permit reach adjustment, or rake adjustment, or both, of the steering wheel. In the event of a crash the shroud must be able to move, and this is achieved if it is able to break free of the clamp mechanism, or for the support bracket to be able to break free of the vehicle body, to allow the steering column assembly to collapse telescopically.

SUMMARY OF THE INVENTION

In accordance with a first aspect of the invention there is provided a steering column assembly comprising: a telescopic shroud having an outer shroud portion and an inner shroud portion, an end of the inner shroud portion extending into the outer shroud portion, a clamp rail fixed to the inner shroud portion including a slot that extends axially along the inner shroud portion, the slot defining two opposing walls which each carry a row of teeth, the two rows thereby being spaced apart from one another with the teeth extending towards each other;

a clamp bolt that extends perpendicular to the shroud that may be rotated around its long axis by operation of a locking lever, a toothed block that is connected to the clamp bolt and is displaced on rotation of the clamp bolt, a carrier element that supports the toothed block and is movable in response to rotation of the clamp bolt to in turn move the toothed block between a clamped position in which the block is located in the slot with the teeth of the block in the same plane as the teeth of the slot and an unclamped position in which the toothed block is held such that the teeth of the block are out of the plane of the teeth of the slot; and in which the carrier element is free to move from side to side relative to the slot; and further comprising a frangible pin that secures the toothed block to the carrier element, the frangible pin having a first end located in a bore in the toothed block and a second end located in a bore in the carrier element, the toothed block being supported on a shoulder of the frangible pin, and in which a clearance is provided between the frangible pin and the walls of one of the bores to permit side to side movement of the toothed block relative to the carrier element.

Preferably, the clearance may be provided between the frangible pin and the walls of the bore of the toothed block.

The clearance between the frangible pin and the toothed block may also permit some movement of the toothed block fore and aft along the axis of the slot.

A further amount of free play may permit the toothed block to move towards and away from the carrier element. This movement may be small enough only to ensure the toothed block does not bind on the carrier element during use.

Providing a frangible pin between the carrier element and the toothed block allows the toothed block and hence shroud to move in the event of a crash yet prevents the movement at all other times, locking the steering shroud in place during normal use. Providing some free play between the toothed block and carrier helps to prevent an accidental breakage of the frangible connector is an excess side load is applied to the toothed block.

The steering column assembly may further comprise side rails formed into the carrier element, the side rails acting to guide the toothed block after breakage of the frangible pin.

The side rails may each include an undercut, the edge of the toothed block fitting into the undercut.

The toothed block may slide across the carrier element during side to side movement during clamping and may slide along the side rails when moving fore and aft.

The amount of clearance between the frangible pin and the bore may be selected to be greater than the side to side movement of the block allowed by the side rails, such that any side load on the toothed block is reacted by the toothed block pressing on one of the side rails rather than the force being reacted by the frangible pin. This ensures that a side load applied to the toothed block is not reacted by the pin during clamping which could otherwise cause the pin to snap unexpectedly.

The carrier element may be located above the toothed block when in use, the operation of the clamp bolt causing the toothed block to move in a direction perpendicular to the axis of the steering column when moving between the clamped and unclamped positions.

The toothed block may therefore be hung below the carrier element.

The frangible pin may comprise a stem and an oversized head, the bore in the toothed block being sized smaller than the head of the pin such that the head of the pin prevents the toothed block from becoming disconnected from the carrier element.

The stem of the frangible pin may be a press fit in the bore of the carrier element. Alternatively it may be provided with an external thread that engages a complimentary thread of the bore of the carrier element.

The end of the bore in the toothed block which is furthest from the carrier element may taper to form a conical pocket, the head of the pin being located at least partially within this conical pocket. This feature helps the toothed block to self centre relative to the connecting pin as the toothed block is pulled out of the slot, ensuring free play of the block to both sides as it is later reclamped.

The assembly may further comprise a rocker including a body from which extends a lever arm, the body having an opening through which the clamp bolt passes, the rocker converting a rotation of the clamp bolt about its axis in a first direction into an upward motion of the lever arm and into a downward motion when the clamp bolt is rotated in the opposing second direction, and the carrier element may comprise a rigid block that has a central opening in which the end of the lever arm is located.

The teeth of the two rows of teeth of the slot and the teeth of the two rows of teeth of the block are shaped such that for any given position of the outer shroud relative to the inner shroud the block is free to move into the slot when the carrier is moved into the clamped position from the undamped position without being blocked by the teeth of the block striking the teeth of the slot, and whereby upon movement of the block into the clamped position the block comes to rest with the block located at one side of the slot or the other, and in that the teeth of a first row of the slot and the corresponding teeth of the block when in flank to flank contact prevent axial movement of the block along the slot in a direction corresponding to a telescopic collapse of the shroud and in that the teeth of a second row of the slot and the corresponding teeth of the block permit axial movement of the block along the slot in a direction corresponding to a collapse of the shroud whilst applying a thrust to the block that moves the block sideways across the slot so that the flanks of the teeth of the first row face the flanks of the corresponding teeth of the block.

The assembly may include an energy absorbing system comprising a puller that is fixed relative to the clamp rail and a deformable energy absorbing device, that connects with or is integral to the puller, which connects to a part of the assembly that is fixed relative to the body of the vehicle when in use, whereby in the event of a crash that causes the frangible pin to shear the toothed block moves with the clamp rail to engage the puller and upon further movement to cause the puller to deform the energy absorbing device.

The toothed block may be spaced from the puller by a distance $b_1$ that is equal to or less than the amount of free play between the frangible pin and the toothed block in a direction of movement of the toothed block along the axis of the slot.

This ensures that the puller provides the limit on the range of movement of the block along the axis of the slot rather than the frangible pin providing the limit, ensuring no accidental load on the pin during clamping. This again reduces the risk of the frangible pin breaking unexpectedly. The distance $b_1$ could be chosen to be appropriate to suit the collapse characteristics required for the installation.

Other advantages of this invention will become apparent to those skilled in the art from the following detailed description of the preferred embodiments, when read in light of the accompanying drawings.

DETAILED DESCRIPTION OF THE INVENTION

Figure 1:
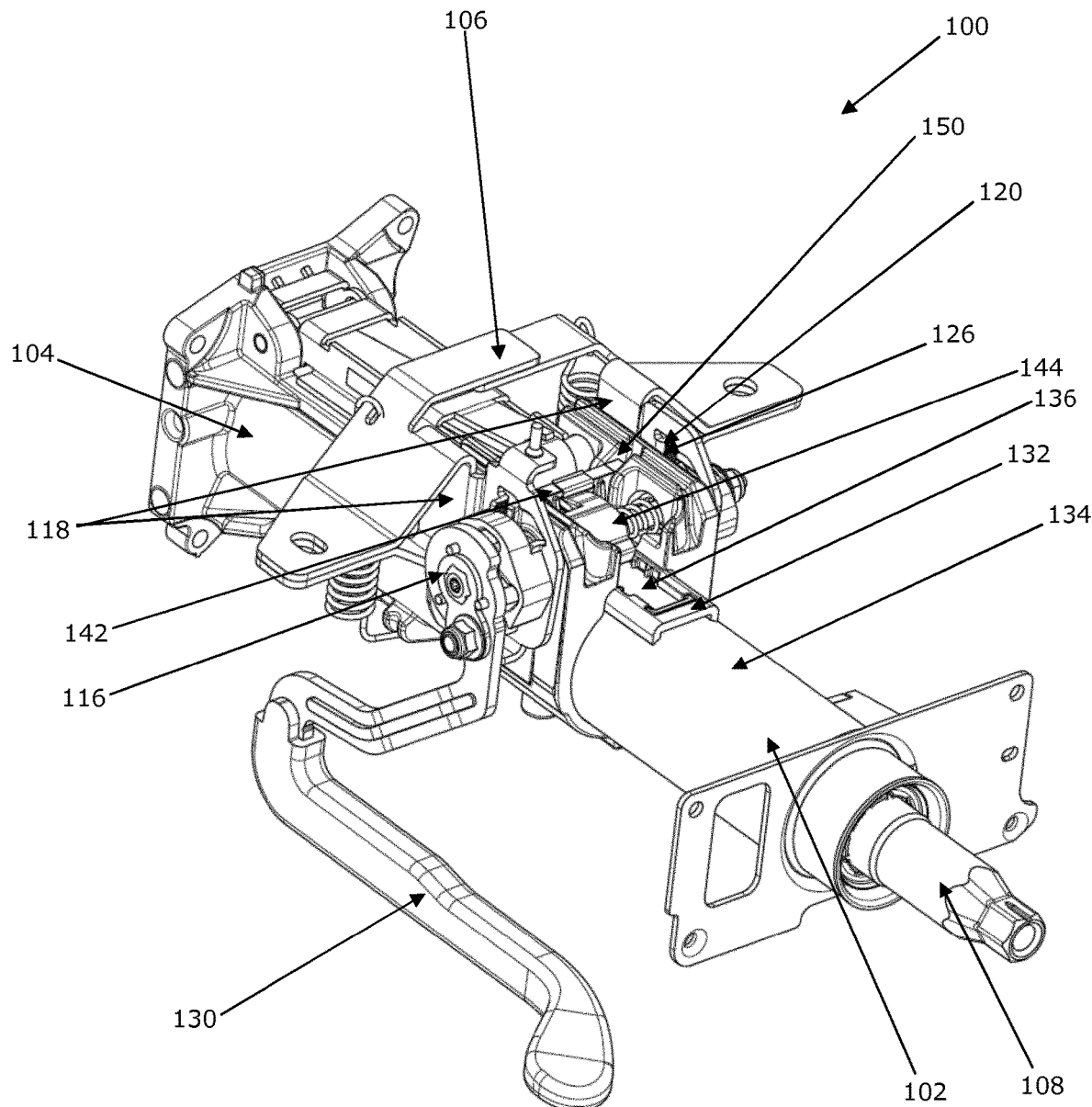
FIG. 1 depicts an isometric view of a steering column assembly in accordance with the first aspect of the invention.
Figure 2:
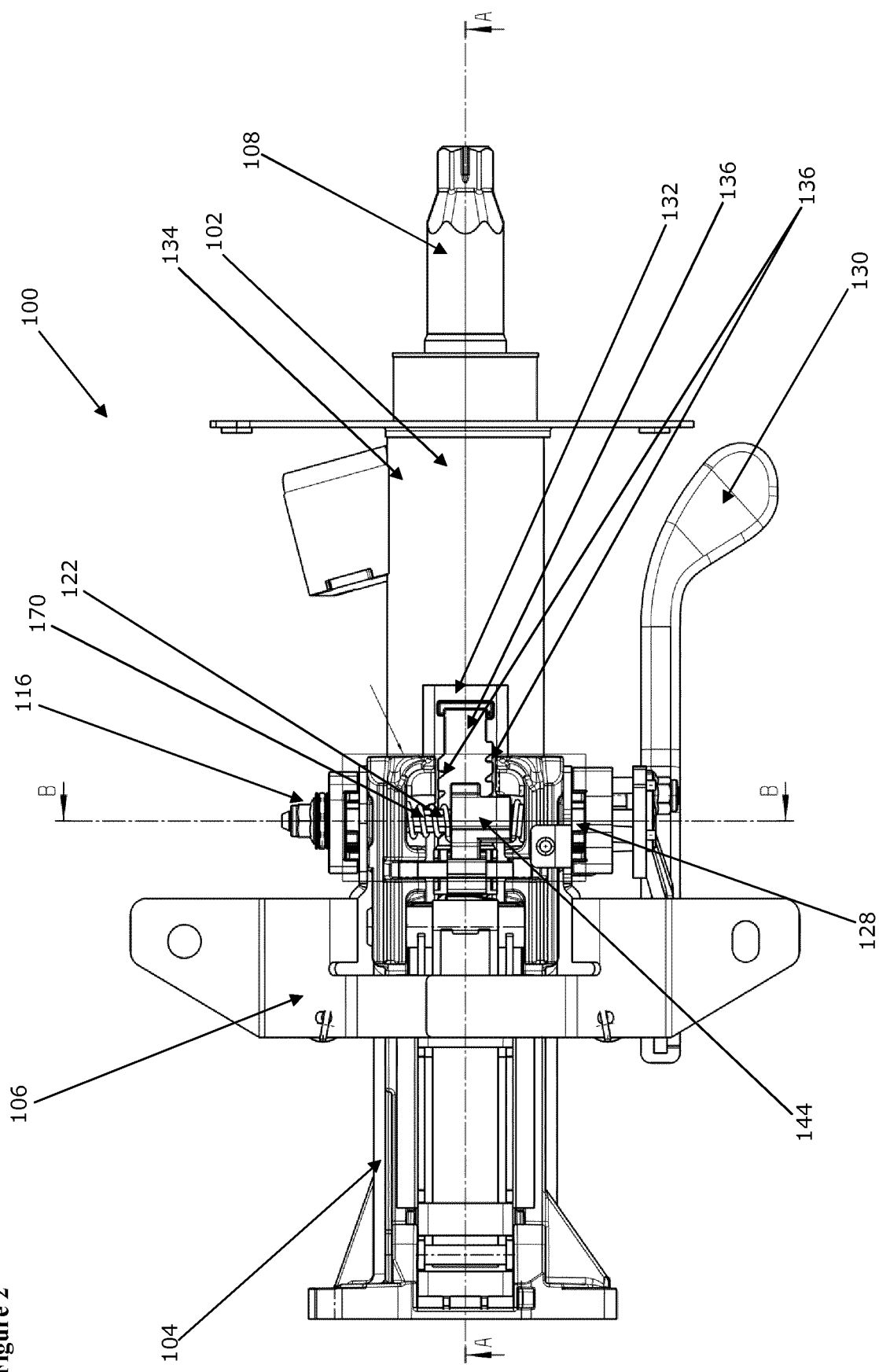
FIG. 2 shows a plan view of the steering column assembly of FIG. 1.
Figure 3:
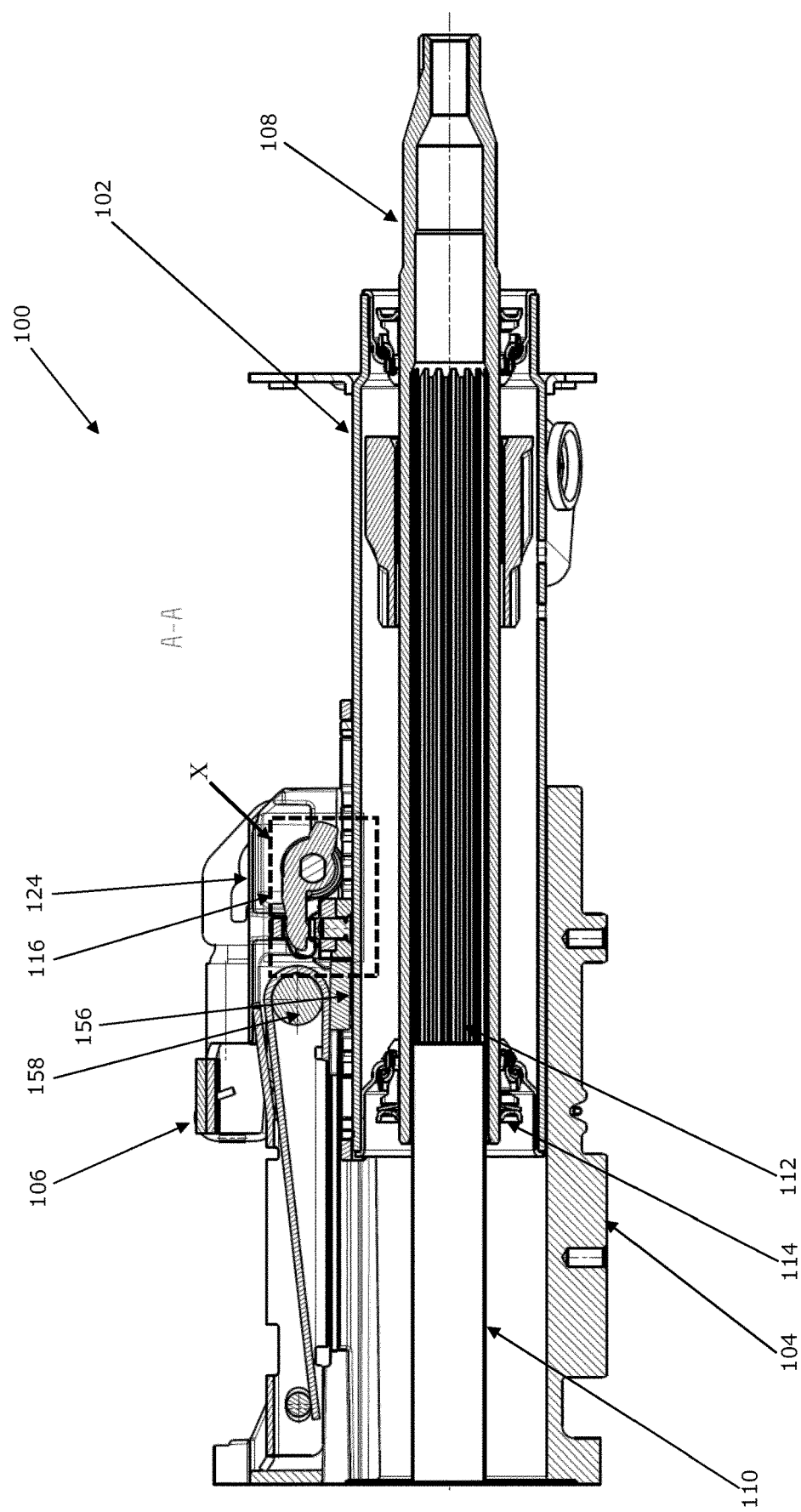
FIG. 3 is a cross-sectional representation of the steering column assembly of FIG. 2 along the line A-A.

Referring first to FIGS. 1 to 3, a steering column assembly 100 is shown, in accordance with the first aspect of the invention. The steering column assembly 100 comprise a shroud 102, 104 having and inner shroud portion 102 and an outer shroud portion 104, each of which comprises a substantially cylindrical tube. The shroud 102, 104 extends from a gearbox housing (not shown) that is fixed at a pivot point to a part of the vehicle body and also releasably fixed to a support bracket 106 which is secured to the vehicle, typically by welding or bolting it to a region under the dashboard at a point somewhere between the pivot and the steering wheel.

The shroud portions 102, 104 are moveable relative to each other with the end of the inner shroud portion 102 being a sliding fit within an end of the outer shroud portion 104. The shroud 102, 104 surrounds a telescopic steering column shaft 108, 110. The shaft 108, 110 includes an upper shaft portion 108 that at least partially surrounds a lower shaft portion 110, the two portions being connected through complimentary axially extending splines 112. The opposite end of the upper shaft portion 108 is tapered so that it can be secured to a steering wheel (not shown). The lower shaft portion 110 is connected to the gearbox housing (not shown), which in turn connects to the road wheels of the vehicle. The skilled person will understand that the invention also applied to so-called "inverted tube in tube" assemblies in which the moving part will slide over the fixed part rather than within it.

As depicted, the upper shaft portion 108 fits over the lower shaft portion 110 and can move axially whilst the lower shaft portion 110 is fixed in an axial direction. Similarly, the inner shroud portion 102 is located towards the steering wheel and slides within the outer shroud portion 104, which is also fixed in an axial direction. An upper column bearing assembly 114 is located between the upper shaft portion and the outer shroud portion. This snugly fills the space and ensures that the shaft 108, 110 is located securely within the shroud 102, 104.

The shroud 102, 104 is fixed to the bracket 106 by a clamp mechanism 116. The clamp mechanism 116 can be unlocked and locked to allow the rake of the steering column shroud 102, 104 to be adjusted by pivoting about the pivot point. When locked the steering column shroud 102, 104 cannot easily be moved.

The bracket 106 includes two arms 118 which extend generally downwards in a vertical plane and extend down either side of the shroud 102, 104. The bracket 106 is securable to the vehicle body using bolts (not shown) that pass through openings 120 in the bracket 116.

The clamp mechanism 116 comprises a clamp bolt 122 or pin which passes through a respective generally vertical slot 124 in each arm 118. The shape of the vertical slots 124 determines the available rake adjustment of the steering column shroud 102, 104. The slots 124 include a vertical rack 126 with a plurality of teeth. Respective cams 128 mounted on the clamp bolt 122 releasably engage with the teeth of the vertical rack 126 upon rotation of the clamp bolt 122. A lever 130 mounted adjacent to one end of the clamp bolt 122 enables this rotation. Thus, the rake of the steering column assembly 100 can be adjusted.

In order to adjust for reach, a clamp rail or horizontal rack 132 is provided which in the depicted embodiment is affixed to an outer surface 134 of the inner shroud portion 102. The horizontal rack 132 includes a slot 136 with two opposing and parallel rows of teeth 138, extending in an axial direction along the inner shroud portion 102.

Releasably engageable with the horizontal rack 132 is a toothed block 140. The toothed block 140 includes a row of teeth on each of its sides which are complementarily-shaped so as to allow engagement with the teeth of the horizontal rack 132. The toothed block 140 itself is held in a fixed position relative to the support bracket 106 by a carrier element 142. Thus, with the toothed block 140 in a clamped condition, the teeth provide positive locking of the toothed block 140, and thus the support bracket 106, relative to the horizontal rack 132 which prevents the inner shroud portion 102 moving in an axial direction.

Figure 4:
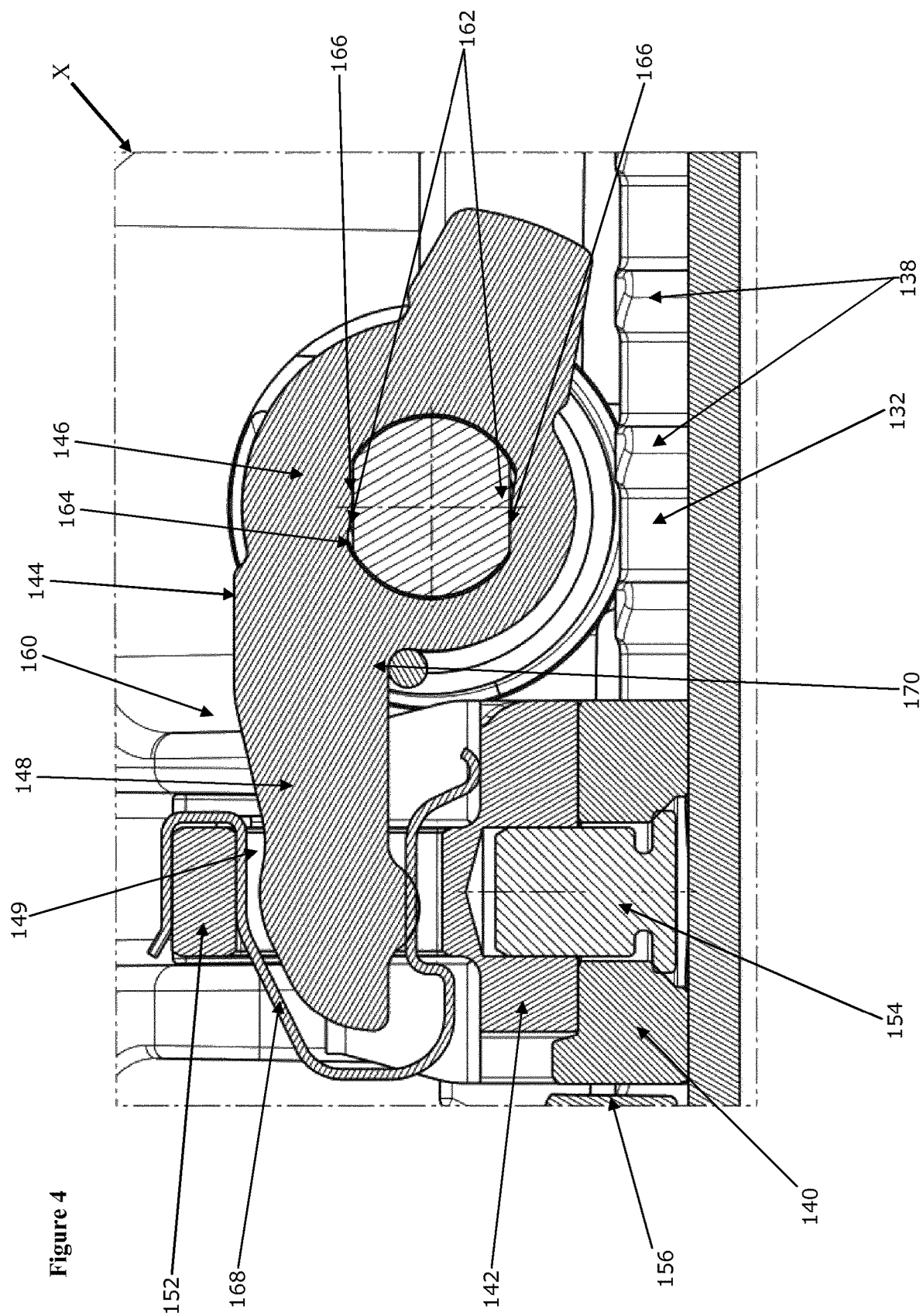
FIG. 4 is an enlarged view of the rocker, toothed block, and slot of FIG. 3.
Figure 5:
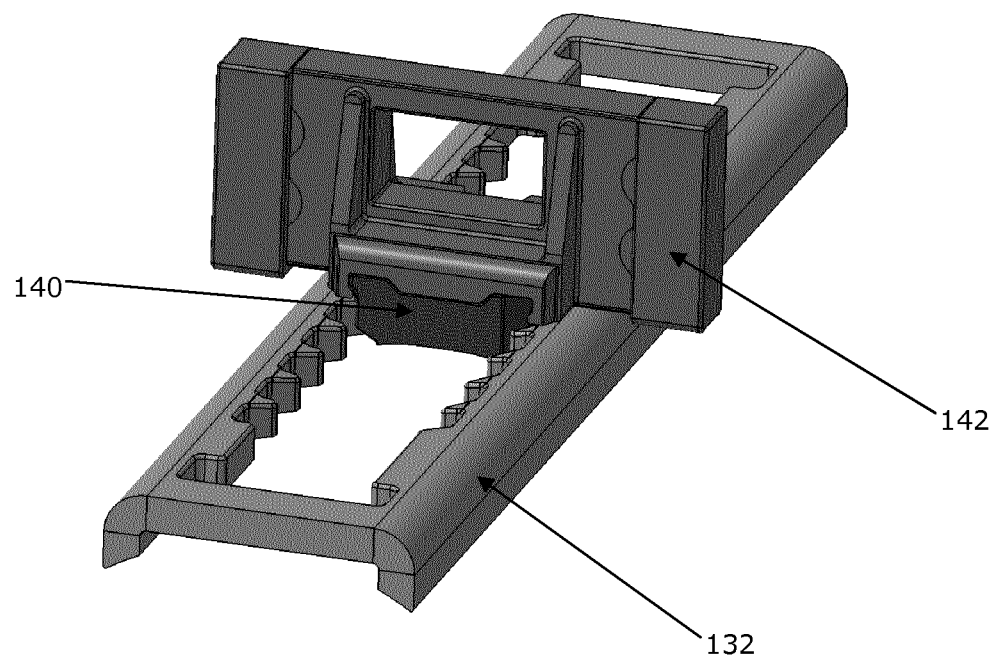
FIG. 5 is view of the carrier, the toothed block and the slot with other parts removed for clarity.

The releasable engagement of the toothed block 140 is controlled by a rocker 144 which is attached to the clamp bolt 122 and positioned, in use, between the two arms 118 of the support bracket 106. The rocker 144 is shown in detail in FIG. 4.

The rocker 144 includes a main body 146 which is located about the clamp bolt 122 and a lever arm 148 which extends towards and is received within an opening 149 in the carrier element 142. The carrier element 142 is held in the support bracket 106 within guides 150 which allow movement only in a radial direction relative to the shroud 102, 104. As such, upon rotation of the rocker 144 in a first direction, the lever arm 148 presses against an upper portion 152 of the carrier element 142, causing the movement of the carrier element 142 away from the horizontal rack 132 and drawing the toothed block 140 out of engagement. Upon rotation of the rocker 144 in a second direction opposite to the first direction, the carrier element 142 is lowered and the toothed block 140 is engaged with the horizontal rack 132.

The toothed block 140 is separable from the carrier element 142 in the event of a large force being exerted on the toothed block 140, for example in the event of a crash in which the driver of the vehicle impacts the steering wheel. The toothed block 140 is connected to the carrier element 142 by way of a frangible pin 154. The frangible pin 154 is configured to break upon the application of a predetermined force, which can thus be configured to be the force likely to be endured in a crash situation. The breaking of the frangible pin 154 allows the inner shroud portion 102, with horizontal rack 132 and toothed block 140 attached, to collapse, whilst the clamp mechanism 116 and carrier element 142 stay in position relative to the support bracket 106.

During collapse, the toothed block 140 will impact upon, and move a puller 156. The puller 156 comprises a strip of material, usually metal, which is deformed around an anvil 158 upon movement of the toothed block 140. As such, the collapse of the steering column assembly 100 is controlled.

The clamp mechanism 116, including the rocker 144 and carrier element 142, also comprises a lost motion mechanism 160. The lost motion mechanism 160 is configured such that the lever 130 of the clamp mechanism 116 can move through an angle which is comparatively larger than that to engage and disengage the toothed block 140. This results in an enhanced user experience.

A first part of the lost motion mechanism 160 is allowed by the relative shapes of the rocker 144 and clamp bolt at the point at which they engage. The relative shapes allow the clamp bolt 122 to freely within the rocker 144 before engaging and causing movement of the rocker 144. This allows the lever 130 to move through a predetermined angle allowed by the relative shapes of the rocker 144 and clamp bolt 122 before moving the rocker 144. This first part of the lost motion mechanism 160 therefore causes rotational reduction between the clamp bolt 122 and rocker 144.

In the depicted embodiment, the clamp bolt 122 is formed as a cylinder flattened so as to produce two additional opposing faces 162. Similarly, a bore 164 of the rocker 144 through which the clamp bolt 122 passes is substantially cylindrical but with two opposing inwardly-curved faces 166. Spaces are formed between the opposing faces 162 of the clamp bolt 122 and the inwardly-curved faces 166 of the rocker 144 which allows the lost motion before engagement. Due to the curvature of the inwardly-curved faces 166 of the rocker 144, the area of engagement is relatively large such that the force of the lever 130 motion is spread over the rocker 144. However, it is also possible to provide planar faces, although this may result in high levels of stress within the rocker 144.

Alternative methods of allowing motion between the clamp bolt 122 and the rocker 144 before engagement may also be used. For example, loose fitting pins between the two parts could allow free play or any other form of inter-engagement may be adapted to achieve this feature.

A further part of the lost motion mechanism 160 is formed by the engagement of the lever arm 148 of the rocker 144 with the carrier element 142. The opening 149 in the carrier element 142 is larger than the lever arm 148 such that the lever arm 148 may move within the carrier element 142 before contacting the carrier element 142. Additionally, as the opening 149 is wider than the lever arm 148, the carrier element 142 may move laterally during engagement of the toothed block 140 with the horizontal rack 132, aiding engagement.

As an additional feature, a leaf spring 168 is positioned at least partially between the lever arm 148 and the carrier element 142. In the depicted embodiment the leaf spring 168 acts to provide a biasing force to the carrier element 142, when the clamp mechanism 116 is in the clamped position. Advantageously, the leaf spring 168 also reduces rattle of the carrier element 142, ensuring that the assembly feels of a high quality to a user. The leaf spring 168 is fixed onto the upper portion 152 of the carrier element 142 and extends over an end of the lever arm 148. When the lever arm 148 moves clockwise, the leaf spring 168 does not absorb any of the motion and the lever arm 148 forces the carrier element 142 to move upwards in the guides 150. However, when the lever arm 148 moves anticlockwise, the spring 168 does resist the motion once the toothed block 140 is engaged, causing the biasing force to be applied to the toothed block 140 and providing increased force feedback to the user, such that they are aware that the toothed block 140 is engaged with the horizontal rack 132. In order to assist with the depression of the leaf spring 168, the lever arm 148 includes a protrusion which engages with the leaf spring 168 throughout the motion. Alternatively, the protrusion may be found on the leaf spring 168 itself.

A coil spring 170 is provided which locates the rocker 144 in the centre of the clamp bolt 122. The coil spring 170 resists any substantial lateral movement of the rocker 144 along the clamp bolt 122 whilst preventing or limit the transmission of vibrations between the support bracket 106, clamp bolt 122, and rocker 144, lowering the chances of unwanted rattle.

When moving from the unclamped position to the clamped position, the toothed block 140 will be pushed down into the slot 136 until the teeth 172 of the block 140 are in the plane of the teeth 138 of the slot 136. During this motion, the block 140 may move sideways if the teeth 172 on one side of the block 140 are located fully, or partially, above any of the teeth 138 of the slot 136. The sideways thrust is achieved because of a sloped shape of the top of the teeth 138 of the slot 136 and the shape of the underside of the teeth 172 of the block 140. If there is no tooth on tooth contact, the block 140 will come to rest aligned with the centre line of the slot 136. This side to side movement is accommodated by a corresponding side to side sliding movement of the carrier element 142.

The teeth on one side of the slot 136 are offset from the teeth on the other. In this example they are offset by one half pitch. Also the tips of the teeth on the sides of the slot 136 face across the slot 136 towards each other, and the teeth of the toothed block 140 face outwards from the sides of the block 140. This offset is crucial in ensuring a tooth on tooth situation is avoided.

Figure 6A:
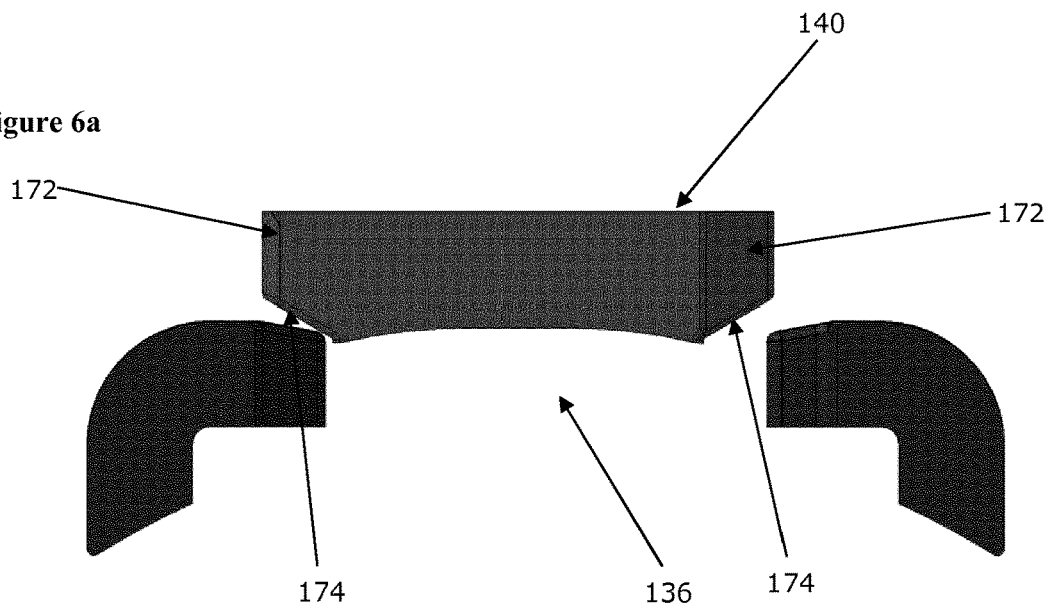
FIGS. 6a to 6c show the movement of the toothed block into the slot in the case of a tooth on tooth situation, showing the sideways movement of the toothed block and carrier.
Figure 6B:
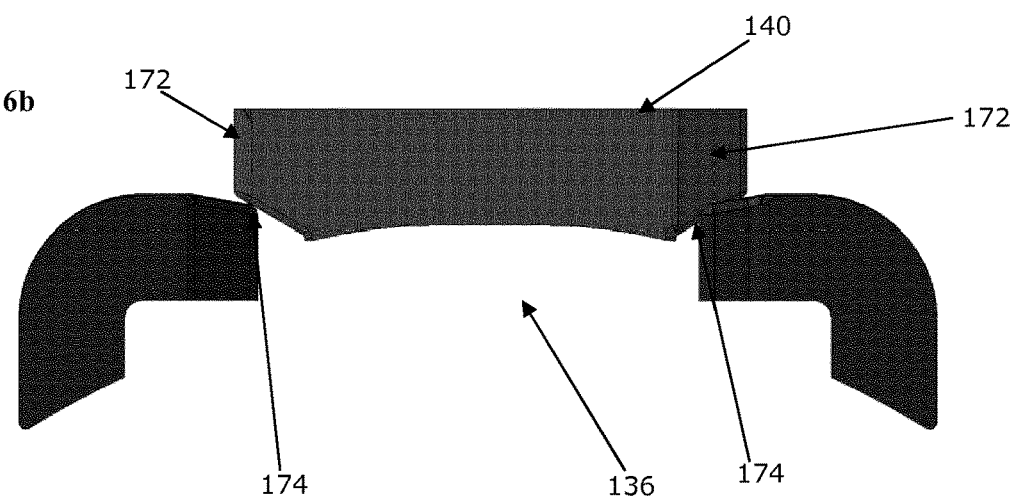
Figure 6C:
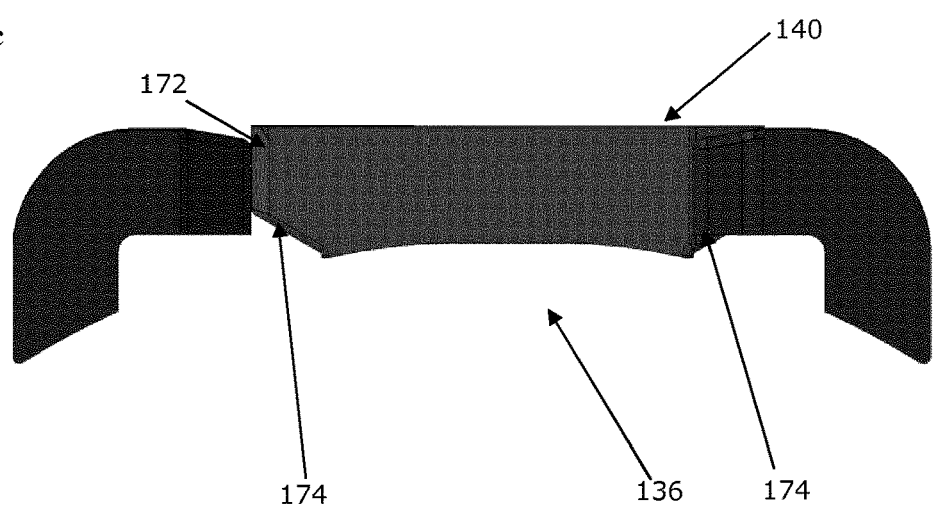

FIGS. 6a to 6c show how the toothed block 140 will move sideways when a potential tooth on tooth collision occurs, allowing it to rest in the fully clamped condition within the slot 136 without being blocked. Ramps 174 on the sides of the teeth 172 help provide the sideways thrust that is needed, and the offset of the teeth 172 ensures there is always a space for the block 140 to move down into once the end of the ramps 174 has been reached.

The teeth of the first side of the slot 136 and toothed block 140 may be considered to be functional teeth in so far as they are actively engaged in a crash to prevent collapse. The teeth on the other side of the slot 136 and toothed block 140 may be considered to be non-functional teeth because they do not prevent movement of the shroud in the collapse direction but do push the toothed block 140 across to the other side of the slot 136 to allow the functional teeth to prevent further movement.

When clamped in the position shown in FIG. 6c, the inner shroud portion 102 cannot move telescopically by any significant amount in either axial direction because of interaction between the teeth 172 of the block 140 and teeth 138 of the slot 136. Movement in the collapse direction of the shroud is blocked immediately if the block 140, following clamping, is on the functional side of the slot 136. If it is on the non-functional side a small amount of movement is possible as the non-functional side teeth push the block 140 across to the functional side of the slot. Friction in the system means that a reasonable amount of force is needed for this to happen. Similarly, if the driver tries to move the inner shroud portion 102 in a direction opposite to the crash direction, for instance by pulling on the steering wheel, the teeth of the non-functional side swap their purpose and become functional teeth, whilst those on the other side swap their function and act to push the block 140 across the slot 136.

In the event of a crash, at low forces the toothed block 140 will prevent movement of the shroud but at higher forces the pin 154 that connects the block 140 to the carrier element 142 will shear. This allows the toothed block 140 to be carried along in the slot 136, so that the inner shroud portion 102 can collapse. An energy absorbing mechanism may be provided that absorbs energy associated with this collapse movement. This may act between the toothed block 140 and the support bracket 106, so that as the toothed block 140 moves away from the carrier element 142 it activates the energy absorbing mechanism.

Figure 7:
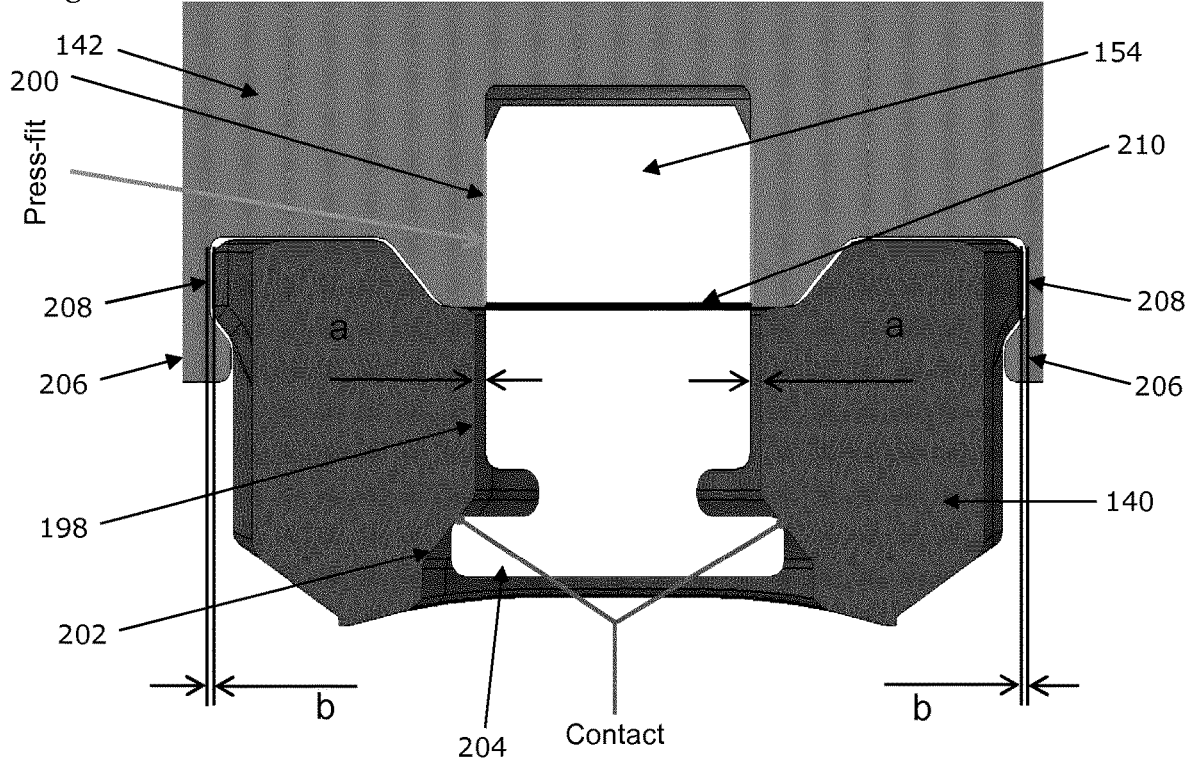
FIG. 7 shows how the toothed block is connected to the carrier viewed along the axis of the slot.

The applicant has appreciated that during clamping, when a side load is applied to the toothed block, there is a risk that the frangible pin 154 may be accidentally damaged or even completely sheared. To overcome this, the toothed block 140 and carrier element 142 are arranged such that the side load is not reacted by the pin 154. This is best understood with reference to FIG. 7.

As can be seen, the toothed block 140 is connected to the carrier element 142 by the frangible pin 154. The frangible pin 154 has a first end located in a bore 198 in the toothed block 140 and a second end located in a bore 200 in the carrier element 142. The end of the frangible pin 154 in the carrier element 142 is a press fit so it cannot pull free during normal use. The end of the bore 198 in the toothed block 140 that is furthest from the carrier element 142 is tapered to form a conical pocket 202. This locates an oversized head 204 of the pin 154, the oversized head 204 acting as a shoulder on which the carrier element 142 is supported. In order to assist in the press fitting of the frangible pin 154, the frangible pin may, for example, include a flattened portion or the bore 198 may include a groove, allowing space for air to escape.

Importantly, a clearance is provided between the frangible pin 154 and the walls of the bore 198 in the toothed block 140 to permit side to side movement of the toothed block 140 relative to the carrier element 142. This allows the toothed block 140 to slide from side to side relative to the carrier element 142. The shoulder or conical pocket 202 cooperates with the head 204 of the pin 154 to ensure that as the carrier element 142 pulls the toothed block 140 out of the slot 136 the block 140 floats on the pin 154 and may also self-centre, giving an equal clearance on each side of the pin 154 within the bore 198.

As well as the frangible pin 154, the toothed block 140 is further secured to the carrier element 142 by two side rails 206 on the carrier element 142 that receive a respective edge of the toothed block 140 within an undercut 208. These rails 206 allow the toothed block 140 to slide fore and aft relative to the carrier element 142. They may also provide end stops that define the maximum side-to-side movement of the toothed block 140 relative to the carrier element 142.

To ensure the frangible pin 154 does not react the side loads applied to the toothed block 140, the clearance between the pin 154 and the bore 198 in the toothed block 140 is chosen to be equal to or greater than the clearance between the side rails 206 and the edges of the toothed block 140. Thus, the block 140 strikes a side rail 206 before it strikes the side of the frangible pin 154, protecting the pin 154.

The frangible pin also includes a shear section 210, situated between the carrier element 142 and the toothed block 140. The shear section 210 is the position at which the frangible pin 154 is designed to break, it being the plane at the intersection of the carrier element 142 and the toothed block 140. Thus, when the frangible pin breaks under the loads expected during a collision, the toothed block 140 will be able to move independently of the carrier element 142.

Figure 8:
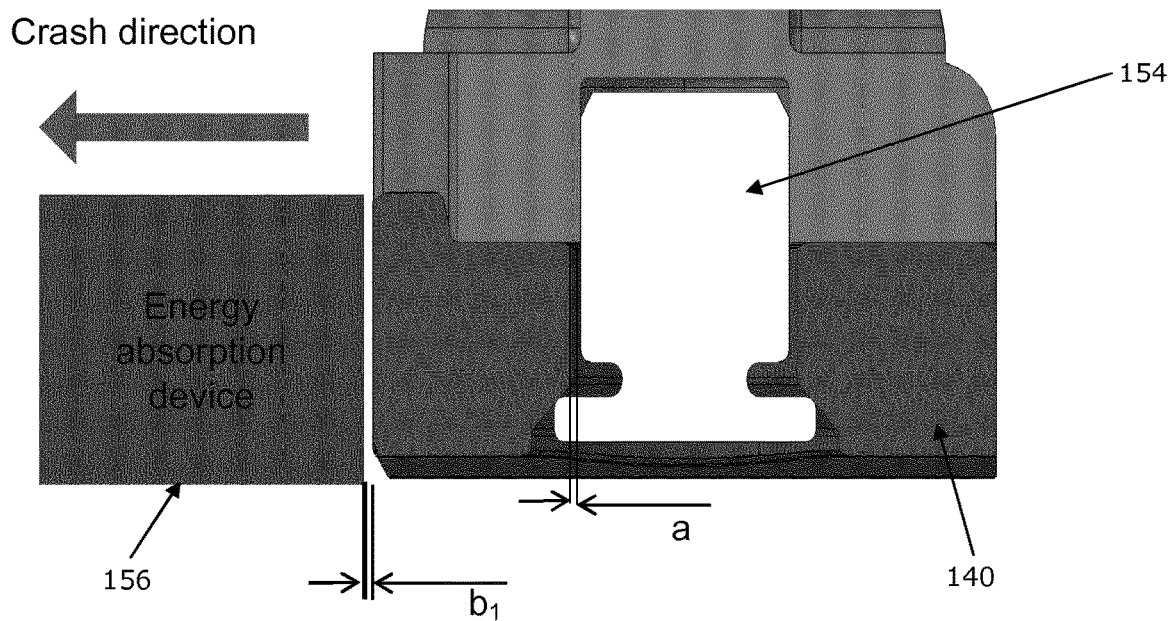
FIG. 8 is a view of the toothed block and carrier from the side showing the relative position of the puller of the energy absorbing mechanism.

FIG. 8 shows that a similar clearance is provided around the pin 154 that is chosen to be greater than or equal to the spacing between the leading edge of the toothed block 140 and the puller 156. Any unusual load applied to the toothed block 140 along the axis of the slot 136 during clamping will be reacted by the puller 156 and not by the clamp bolt 122.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A steering column assembly comprising:
   a telescopic shroud having an outer shroud portion and an inner shroud portion, an end of the inner shroud portion extending into the outer shroud portion,
   a clamp rail fixed to the inner shroud portion including a slot that extends axially along the inner shroud portion, the slot defining two opposing walls which each carry a row of teeth, the two rows thereby being spaced apart from one another with the teeth extending towards each other;
   a clamp bolt that extends perpendicular to the telescopic shroud that is configured to be rotated around its long axis by operation of a locking lever,
   a toothed block that is connected to the clamp bolt and is displaced on rotation of the clamp bolt,
   a carrier element that supports the toothed block and is movable in response to rotation of the clamp bolt to in turn move the toothed block between a clamped position in which the block is located in the slot with teeth of the toothed block in the same plane as the teeth of the slot and an unclamped position in which the toothed block is held such that the teeth of the block are out of the plane of the teeth of the slot; and in which
   the carrier element is free to move from side to side relative to the slot; and
   further comprising a frangible pin that secures the toothed block to the carrier element, the frangible pin having a first end located in a bore in the toothed block and a second end located in a bore in the carrier element, the toothed block being supported on a shoulder of the frangible pin,
   and in which a clearance is provided between the frangible pin and a wall of the bore to permit side to side movement of the toothed block relative to the carrier element.

2. The steering column assembly as claimed in claim 1, wherein the clearance is provided between the frangible pin and the wall of the bore of the toothed block.

3. The steering column assembly as claimed in claim 1, wherein the clearance between the frangible pin and the toothed block also permits some movement of the toothed block fore and aft along an axis of the slot.

4. The steering column assembly as claimed in claim 1, further comprising side rails formed into the carrier element, the side rails acting to guide the toothed block after breakage of the frangible pin.

5. The steering column assembly as claimed in claim 4, wherein the side rails each include an undercut, an edge of the toothed block fitting into the undercut.

6. The steering column assembly as claimed in claim 4, wherein the toothed block slides across the carrier element during side to side movement during clamping and/or slides along the side rails when moving fore and aft.

7. The steering column assembly as claimed in claim 4, wherein an amount of clearance between the frangible pin and the bore may be selected to be greater than a side to side movement of the toothed block allowed by the side rails, such that any side load on the toothed block is reacted by the toothed block pressing on one of the side rails rather than the side load being reacted by the frangible pin.

8. The steering column assembly as claimed claim 1, wherein the carrier element is located above the toothed block when in use, an operation of the clamp bolt causing the toothed block to move in a direction perpendicular to an axis of the steering column assembly when moving between the clamped and unclamped positions.

9. The steering column assembly as claimed in claim 1, wherein the frangible pin comprises a stem and an oversized head, the bore in the toothed block being sized smaller than the head of the frangible pin such that the head of the frangible pin prevents the toothed block from being disconnected from the carrier element.

10. The steering column assembly as claimed in claim 9, wherein the stem of the frangible pin is a press fit in the bore of the carrier element.

11. The steering column assembly as claimed in claim 9, wherein an end of the bore in the toothed block which is furthest from the carrier element tapers to form a conical pocket, the head of the frangible pin being located at least partially within the conical pocket.

12. The steering column assembly as claimed in claim 1, further comprising a rocker including a body from which extends a lever arm, the body having an opening through which the clamp bolt passes, the rocker converting a rotation of the clamp bolt about the axis thereof in a first direction into an upward motion of the lever arm and into a downward motion when the clamp bolt is rotated in an opposing second direction.

13. The steering column assembly as claimed in claim 12, wherein the carrier element comprises a rigid block that has a central opening in which an end of the lever arm is located.

14. The steering column assembly as claimed in claim 1, wherein the teeth of the two rows of teeth of the slot and the teeth of the two rows of teeth of the toothed block are shaped such that for any given position of the outer shroud relative to the inner shroud the block is free to move into the slot when the carrier element is moved into the clamped position from the unclamped position without being blocked by the teeth of the toothed block striking the teeth of the slot, and whereby upon movement of the block into the clamped position the toothed block comes to rest with the block located at one side of the slot or the other, and in that the teeth of a first row of the slot and the corresponding teeth of the toothed block when in flank to flank contact prevent axial movement of the block along the slot in a direction corresponding to a telescopic collapse of the shroud and in that the teeth of a second row of the slot and the corresponding teeth of the toothed block permit axial movement of the block along the slot in a direction corresponding to a collapse of the shroud whilst applying a thrust to the toothed block that moves the block sideways across the slot so that the flanks of the teeth of the first row face the flanks of the corresponding teeth of the toothed block.

15. The steering column assembly as claimed in claim 1, further comprising a puller that is fixed relative to the clamp rail and a deformable energy absorbing device, that connects with or is integral to the puller, which connects to a part of the assembly that is fixed relative to the body of the vehicle when in use, whereby in the event of a crash that causes the frangible pin to shear the toothed block moves with the clamp rail to engage the puller and upon further movement to cause the puller to deform the energy absorbing device.

16. The steering column assembly as claimed in claim 15, wherein the toothed block is spaced from the puller by a distance, that is equal to or less than the amount of free play between the frangible pin and the toothed block in a direction of movement of the toothed block along the axis of the slot.

\* \* \* \* \*